United States Patent [19]

Seneker et al.

[11] Patent Number: 5,843,357
[45] Date of Patent: Dec. 1, 1998

[54] SPANDEX ELASTOMERS

[75] Inventors: Stephen D. Seneker, Sissonville; Bruce D. Lawrey, Charleston, both of W. Va.

[73] Assignee: Arco Chemical Technology, L.P., Greenville, Del.

[21] Appl. No.: 927,559

[22] Filed: Sep. 8, 1997

Related U.S. Application Data

[62] Division of Ser. No. 728,920, Oct. 11, 1996, Pat. No. 5,708,118.
[51] Int. Cl.⁶ .............................. D01F 6/70; D01F 9/24; D01F 13/04; C08G 18/48
[52] U.S. Cl. .................... 264/204; 264/176.1; 264/205; 528/61; 528/64; 528/76; 528/906
[58] Field of Search ................................ 528/61, 64, 76, 528/906; 264/204, 205, 176.1

[56] References Cited

U.S. PATENT DOCUMENTS

| | | | |
|---|---|---|---|
| 3,384,623 | 5/1968 | Inoue et al. ............................. | 528/49 |
| 3,393,243 | 7/1968 | Cuscurida ............................... | 568/620 |
| 3,427,256 | 2/1969 | Milgrom ................................. | 502/150 |
| 3,427,334 | 2/1969 | Belner .................................... | 556/31 |
| 3,427,335 | 2/1969 | Herold ................................... | 549/206 |
| 3,483,167 | 12/1969 | Sommer et al. ......................... | 528/49 |
| 3,829,505 | 8/1974 | Herold ................................... | 568/606 |
| 3,941,849 | 3/1976 | Herold ................................... | 528/92 |
| 3,963,681 | 6/1976 | Kaneko et al. ......................... | 528/61 |
| 4,098,772 | 7/1978 | Bonk et al. ............................ | 528/49 |
| 4,282,387 | 8/1981 | Olstowski et al. ..................... | 568/618 |
| 4,687,851 | 8/1987 | Laughner .............................. | 544/398 |
| 4,934,425 | 6/1990 | Gajewski et al. ...................... | 152/323 |
| 5,000,899 | 3/1991 | Dreibelbis et al. .................... | 564/205 |
| 5,010,117 | 4/1991 | Herrington et al. ................... | 521/159 |
| 5,010,187 | 4/1991 | Heuvelsland .......................... | 536/120 |
| 5,070,125 | 12/1991 | Heuvelsland .......................... | 528/57 |
| 5,077,371 | 12/1991 | Singh et al. ........................... | 528/64 |
| 5,096,993 | 3/1992 | Smith et al. ........................... | 528/61 |
| 5,106,874 | 4/1992 | Porter et al. .......................... | 528/64 |
| 5,114,619 | 5/1992 | Heuvelsland .......................... | 568/613 |
| 5,185,420 | 2/1993 | Smith et al. ........................... | 528/61 |
| 5,340,902 | 8/1994 | Smith et al. ........................... | 528/61 |
| 5,470,813 | 11/1995 | Le-Khac ................................ | 502/175 |
| 5,482,908 | 1/1996 | Le-Khac ................................ | 502/156 |
| 5,545,601 | 8/1996 | Le-Khac ................................ | 502/156 |
| 5,545,706 | 8/1996 | Barksby et al. ....................... | 528/49 |
| 5,563,221 | 10/1996 | Pazos .................................... | 525/409 |
| 5,589,431 | 12/1996 | Le-Khac ................................ | 502/175 |
| 5,616,676 | 4/1997 | Katsuo .................................. | 528/61 |
| 5,644,015 | 7/1997 | Seo et al. .............................. | 528/60 |
| 5,648,447 | 7/1997 | Seneker et al. ....................... | 528/63 |

OTHER PUBLICATIONS

Smith et al.; "Thermoplastic Polyurethane Elastomers Made from High Moolecular Weight Poly–L Polyols"; Polyurethanes World Congress 1991; Sep. 26, 1991; pp. 313–318.
*Concise Encyclopedia of Polymer Science and Engineering*; Kroschwitz, Ed.; John Wiley and Sons; New York; 1990; pp. 383 and 390.
A.T. Chen et al., "Comparison of the Dynamic Properties of Polyurethane Elastomers Based on Low Unsaturation Polyoxypropylene Glycols and Poly9tetramethylene oxide) Glycols," *Polyurethanes World Congress* 1993, Oct. 10–13, 1993, pp. 388–399.
ASTM D–2849–69, "Testing Urethane Foam Polyol Raw Materials", pp. 913–931.

*Primary Examiner*—Rabon Sergent
*Attorney, Agent, or Firm*—Jonathan L. Schuchardt

[57] ABSTRACT

Spandex-type segmented polyurethane/urea elastomers having exceptional elongation, hysteresis, recovery, and other physical properties are prepared by the amine chain extension of an isocyanate-terminated prepolymer prepared by the reaction of a stoichiometric excess of isocyanate with a polyol blend comprising a low molecular weight diol having a molecular weight below 750 Da with a high molecular weight glycol which may be a 1500 Da to 20,000 Da molecular weight, ultra-low unsaturation polyoxypropylene glycol with an unsaturation of less than about 0.010 meq/g.

5 Claims, 1 Drawing Sheet

SPANDEX ELASTOMERS

This is a division of application Ser. No. 08/728,920 filed Oct. 11, 1996 now U.S. Pat. No. 5,708,118.

TECHNICAL FIELD

The present invention pertains to diamine-extended polyurethane/urea elastomers. More particularly, the present invention pertains to diamine-extended spandex-type polyurethane/urea elastomers prepared from prepolymers derived from an ultra-low unsaturation, high molecular weight polyoxyalkylene diol and a low molecular weight diol. The elastomers surprisingly exhibit higher elongation and recovery than elastomers prepared from single diols or mixtures of two or more high molecular weight diols.

BACKGROUND ART

Polyurethane/urea elastomers in the form of fibers and films have found wide acceptance in the textile industry. The term "spandex", often used to describe these elastomers, refers to long chain synthetic polymers comprised of at least 85% by weight of segmented polyurethane. The term "elastane" is used in Europe. Spandex fibers are used for many different purposes in the textile industry, especially in underwear, form-persuasive garments, bathing wear, and elastic garments or stockings. The elastomeric fibers may be supplied as core spun elastomer yarns spun round with filaments or staple fiber yarns, or as staple fiber admixture to nonelastic fibers for the purpose of improving the wearing qualities of fabrics which are not in themselves highly elastic.

In the past, natural rubber thread was the only material available to provide elasticity to fabrics. Spandex, originally developed in the 1950s, has numerous advantages over rubber filaments. The most important of these is its higher modulus. Typically, for a given denier, spandex has at least twice the recovery, or retractive power, of rubber. This enables stretch garments to be manufactured containing less elastic fiber and thus be lighter in weight. Additional advantages over natural rubber include the ability to obtain spandex in much finer deniers, higher tensile strength and abrasion resistance, and in many cases, higher resilience. Additionally, spandex exhibits improved resistance to many cosmetic oils, to solvents, for example those used in dry cleaning, and a high resistance to oxidation and ozone as well. Furthermore, in contrast to rubber filaments, spandex fibers can be dyed relatively easily with certain classes of dye-stuffs.

However, two areas where spandex fibers are inferior to rubber filaments are elongation and mechanical dynamic properties. Spandex fibers typically break at elongations of 500% while rubber filaments have elongations at break of 600 to 700%. In addition, rubber exhibits much lower hysteresis than spandex fibers. Hysteresis is a measure of the energy loss during stretching and retraction of an elastic material. A large energy loss implies heat generation and thus discomfort in wear. So there is a need in the industry for an elastic fiber with both the positive features of spandex such as high retractive power and the positive features of rubber such as high elongation and low hysteresis.

Another important physical property of elastic fibers is the "percent set" or "percent residual elongation," a measure of the fiber's ability to be stretched and then return to its original length. Any excess length is measured as percent set or residual elongation, and low values are desirable. Typical percent sets of spandex fibers are less than 30 percent, preferably less than 25 percent. It is particularly desirable to develop an elastic fiber with the positive features of spandex such as high retractive power, the positive features of rubber such as high elongation and low hysteresis, while retaining a low percent set.

The preparation of polyurethane/urea elastomers by the polyaddition process from high molecular weight, substantially linear polyhydroxy compounds, polyisocyanates and chain lengthening agents which have reactive hydrogen atoms by reaction in a highly polar organic solvents is already known. The formation of fibers, filaments, threads, and films from these solvent-borne polyurethane elastomers is also known. Reference may be made to U.S. Pat. Nos. 3,483,167 and 3,384,623, which illustrate the preparation of spandex fibers from isocyanate-terminated polymeric diols.

In commercial practice, the preferred polymeric diol is polytetramethylene ether glycol (PTMEG). However, not only do PTMEG-derived prepolymers have high viscosities, but solution viscosities of chain-extended elastomers prepared from them are very high as well. As a result, the solids content of spandex spinning solutions must generally be kept low, and removal of solvent from the polymer solution becomes the rate limiting step in spandex fiber production.

It has been known for some time that in principle, polyoxypropylene glycol (PPG) could also be used to prepare spandex fibers. U.S. Pat. No. 3,180,854, for example, discloses a polyurethane/urea fiber based on a 2000 Da molecular weight polyoxypropylene glycol. However, spandex based on polyoxypropylene glycols of 2000 Da molecular weight or lower have inferior percent sets. Higher molecular weight polyoxypropylene glycols made by conventional processes contain high percentages of terminal unsaturation or monofunctional hydroxyl-containing species ("monol"). The monol is believed by many to act as a chain terminator, limiting the formation of the required high molecular weight polymer during the chain extension reaction and therefore yielding products generally inferior in comparison to PTMEG derived elastomers. However, the role of monol as a chain terminator may be over-simplified, as several patents, e.g. U.S. Pat. Nos. 3,384,623 and 4,098,772 disclose preparation of elastomers with enhanced physical properties by purposeful addition of monol to polyurethane elastomer formulations.

Thus, the properties of polyoxypropylene derived spandex are generally inferior to those based on PTMEG, and polyoxypropylene glycols have not been utilized commercially in spandex production. See, e.g., the POLYURETHANE HANDBOOK (Gunther Oertel, Ed., Carl Hanser Verlag Pub., Munich 1985, p. 578: "Polypropylene glycols have so far been used as soft segments only in experimental products since they produce inferior elastanes".

The majority of polyoxyalkylene polyether polyols are polymerized through base catalysis. For example, polyoxypropylene diols are prepared by the base catalyzed oxypropylation of a difunctional initiator such as propylene glycol. During base catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17–21. Unsaturation is measured in accordance with ASTM D-2849-69 "Testing Urethane Foam Polyol Raw Materials," and expressed as milliequivalents of unsaturation per gram of polyol (meq/g).

Due to the continual creation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4000 Da molecular weight, the content of monofunctional species may lie between 30 and 40 mol percent. In such cases, the average functionality is lowered to c.a. 1.6 to 1.7 from the nominal, or theoretical functionality of 2.0. In addition, the polyols have a high polydispersity, $M_w/M_n$ due to the presence of the substantial, low molecular weight fractions. Molecular weights and equivalent weights herein in Da (Daltons) are number average molecular weights and number average equivalent weights, respectively, unless specified otherwise.

Lowering unsaturation and the attendant high monol fraction in polyoxypropylene polyols has been touted as a means of providing polyurethane elastomers with improved properties. For example, use of polyols having low content of monofunctional species has been suggested as a method of increasing polymer molecular weight; and increased polymer molecular weight has, in turn, sometimes been cited as desirable in producing higher performance polymers. However, high molecular weight is not necessarily a desirable feature in many polymer systems. As indicated by G. Odian, PRINCIPLES OF POLYMERIZATION, John Wiley & Sons, © 1981, pp. 20–21, for example, often, the molecular weight to be desired is a moderate rather than a high molecular weight. In engineering thermoplastics, for example, higher molecular weights in general increase tensile strength, melt temperature, modulus, and the like, but if the molecular weight is too high, polymer viscosity becomes too great to process. In polyurethanes, molecular weights are far lower than engineering thermoplastics, and polymer morphology and physical properties are influenced by many factors, including amount and nature of hard segment, stereochemistry of isocyanate used, etc. Often, formulations must be chosen to balance conflicting properties. For example, increases in tensile strength are often accompanied by a decrease in elongation.

Reducing unsaturation in polyoxyalkylene polyols by lowering catalyst concentration and decreasing the reaction temperature is not feasible, as the reaction rate is so slow that oxypropylation takes days or even weeks, although low unsaturation polyols may be prepared in this manner. Thus, efforts have been expended to discover catalysts which can produce polyoxypropylated products in a reasonable amount of time with little introduction of monofunctionality due to allylic species. In the early 1960's, for example, double metal cyanide catalysts such as zinc hexacyanocobaltate complexes were developed as illustrated by U.S. Pat. Nos. 3,427,256; 3,427,334; 3,427,335; 3,829,505; and 3,941,849. Despite lowering unsaturation to the range of c.a. 0.018 meq/g, the cost of these catalysts coupled with the necessity of lengthy and expensive catalyst removal steps prevented commercialization.

Use of alternative basic catalysts such as cesium hydroxide and rubidium hydroxide as disclosed in U.S. Pat. No. 3,393,243, and the barium and strontium oxides and hydroxides, as disclosed in U.S. Pat. Nos. 5,010,187 and 5,114,619, enabled modest improvements in unsaturation, however catalyst expense, and in some cases, toxicity, coupled with the but modest improvements offered, mitigated against commercialization. Catalysts such as calcium naphthenate and combinations of calcium naphthenate and tertiary amines have proven successful, as disclosed in U.S. Pat. Nos. 4,282,387, 4,687,851 and 5,010,117, in preparing polyols with unsaturations—as low as 0.016 meq/g, and more generally in the range of 0.02 to 0.04 meq/g.

In the 1980's, double metal cyanide complex (DMC) catalysts were once more revisited, and improvements in catalytic activity and catalyst removal methods encouraged one manufacturer to offer DMC catalyzed polyols having low unsaturations, i.e., in the range of 0.015 to 0.018 meq/g commercially for a brief time. However, base catalysis continued to be the major method of preparing polyoxypropylene polyols, and continues its dominance to the present day.

Recently, however, further major advances in DMC catalysts and polyoxyalkylation processes by the ARCO Chemical Co. have enabled practical preparation of ultra-low unsaturation polyoxypropylene polyols. High molecular weight polyols, for example those in the 4000 Da to 8000 Da molecular weight range, typically exhibit unsaturation in the range of 0.004 to 0.007 meq/g when catalyzed by the novel DMC catalysts. At these levels of unsaturation, the amount of monofunctional species is only 2 mol percent or less. Moreover, GPC analysis shows the polyols to be virtually monodisperse, often exhibiting polydispersities less than 1.10. Several such polyols have recently been commercialized as ACCLAIM™ polyols. The ultra-low unsaturation polyols have been found to be quantitatively different than both conventional polyols and low unsaturation polyols.

For example, Smith et al. U.S. Pat. No. 5,340,902 discloses spandex fibers prepared from polyoxypropylene diols having low unsaturation, less than 0.03 meq/g. Use of low unsaturation polyoxypropylene diols is stated therein to allow preparation of fibers with properties superior to PTMEG derived spandex fibers. However, all the examples appear to be prophetic, and no physical properties are given. In the substantially contemporaneous publication co-authored by Smith: A. T. Chen et al., "Comparison of the Dynamic Properties of Polyurethane Elastomers Based on Low Unsaturation Polyoxypropylene Glycols and Poly (tetramethylene oxide) Glycols," POLYURETHANES WORLD CONGRESS 1993, Oct. 10–13, 1993, pp. 388–399, conventional, base-catalyzed polyoxypropylene diols having normal (high) levels of unsaturation produced polyurethane/urea cast elastomers with physical properties virtually indistinguishable from those prepared from low unsaturation diols, as demonstrated by an actual comparison of physical properties of PTMEG-derived elastomers with those from conventional polyoxypropylene diols and low unsaturation polyoxypropylene diols. In Shore A 90 cast elastomers, PTMEG-MDI prepolymer-derived, butanediol-extended polyurethane elastomers had slightly lower modulus and elongation than low unsaturation polyoxypropylene diol-derived elastomers, however tensile strength of the PTMEG elastomers was considerably higher. For polyurethane/urea cast elastomers, a direct comparison was not possible, as the only PTMEG example used a 1000 Da PTMEG while both low unsaturation polyoxypropylene diol examples employed c.a. 2000 Da molecular weight diols. The PTMEG example had considerably higher physical properties with the exception of elongation, which was lower as expected due to the lower soft segment molecular weight. All these results must be viewed with caution, as cast and one, shot elastomers cannot be directly compared with spandex elastomers.

Attempts to improve hysteresis are discussed in U.S. Pat. No. 5,000,899 where the prior art disclosed use of a yet more expensive copolymer prepared from tetrahydrofuran and 3-methyltetrahydrofuran to form a PTMEG-type spandex having improved hysteresis. The '899 inventors improved the heat set of similar spandex polymers by using a mixture of specific diamines for chain extension. However, no hysteresis values appear to be reported.

PTMEG is a solid at room temperature and yields MDI prepolymers of extremely high viscosity. As indicated previously, the high viscosity of the neat prepolymers carries over into the chain extended elastomer solutions, limiting processable solids content. Additionally, the spandex produced with PTMEG has relatively low elongation, about 500%, and exhibits high hysteresis in comparison to rubber. Yet, despite the inherent difficulties of handling PTMEG, the limited solids content of spinning solutions, and unsatisfactory elongation and hysteresis, PTMEG continues to be the mainstay of spandex production.

The use of isocyanate-terminated prepolymers prepared by reacting excess isocyanate with specific blends of active hydrogen-functional compounds of different molecular weights has been reported. However, while certain physical properties were improved, many properties remained unchanged or worsened as a result of employing such blends of hydrogen-functional compounds. For example, U.S. Pat. No. 4,934,425 discloses a cast polyurethane/urea, non-pneumatic tire. In nonpneumatic tires, internal ribbed members and webs supply the support function rather than gas under pressure. Heat builds up as the tire cyclically flexes as it rolls under load. The increased temperature results in loss of strength and ultimately, failure.

The '425 patentees discovered that elastomers having greatly improved hysteresis can be prepared by employing toluene diisocyanate-capped prepolymers based on a mixture of polytetramethylene ether glycols (PTMEG), one PTMEG having a molecular weight between 200 Da (Daltons) and 1500 Da, the second PTMEG having a molecular weight between 1500 Da and 4000 Da, the prepolymers cured with an aromatic diamine such as 4,4'-methylenebis(2-chloroaniline). However, despite having lower hysteresis, the elastomers of '425 exhibited approximately the same elongation and 100% modulus, and exhibited significantly worse tensile strength and 300% modulus. Thus, such elastomers are not desirable for use in spandex fiber applications of similar import is U.S. Pat. No. 3,963,681, wherein improvements in cut-growth and flex-crack resistance in pneumatic tires were made by employing polyurethane and polyurethane/urea elastomers based on isocyanate-terminated prepolymers prepared from highly specific blends of PTMEG having an average molecular weight of from 1000 Da to 4500 Da. A first, high molecular PTMEG weight component must have a molecular weight above the so-called "rheological critical weight" while a second, lower molecular weight PTMEG must have a molecular weight below the "Theological critical weight." Thus, blends of 1000 Da and 8500 Da PTMEG diols having an average molecular weight of 5200 Da, and blends of 800 Da and 3800 Da PTMEG diols having an average molecular weight of 1600 Da were found not to work. Improvements in cut-growth and flex-cracking were observed when blends of 1000 Da and 8000 Da polyoxypropylene diols were used.

In U.S. Pat. No. 5,077,371, addition of the dimer of 2,4-toluene diisocyanate (TDI dimer) to TDI was used to lower the free TDI content of isocyanate-terminated prepolymers prepared from blends of PTMEG and 1,4-butanediol, the blend having an average molecular weight in the range of 500 Da to 750 Da. The polymers displayed somewhat lower elongations than those not prepared from TDI dimer-containing isocyanate. Other properties, including compression set, were virtually unchanged. All these references are to PTMEG-derived, cast elastomers. Spandex-type elastomers, chain extended with aliphatic and/or cycloaliphatic diamines in aprotic polar solvents are not disclosed. Moreover, due to their distinct differences, properties of PTMEG-derived polymers could not, in any case, be used to predict properties of non-PTMEG polymers.

It would be desirable to provide spandex elastomers with improved physical properties, particularly with respect to elongation and hysteresis, while maintaining other physical properties. It would be further desirable to provide prepolymers and chain extended polymer solutions of reduced viscosity. It would be still further desirable to offer processable chain-extended spandex elastomer solutions with higher solids content. It would be yet further desirable to provide spandex elastomers based on less expensive and easier to handle polyoxypropylene glycols which exhibit truly improved properties as compared to PTMEG-based elastomers, rather than exhibiting properties which are merely similar.

SUMMARY OF THE INVENTION

It has now been surprisingly discovered that spandex elastomers based on isocyanate-terminated prepolymers derived from a polyol component prepared by the addition of low molecular weight glycols or polyoxypropylene oligomers having molecular weights below 750 Da to ultra-low unsaturation polyoxypropylene glycols having molecular weights in excess of 1500 Da, results in astounding increases in elongation and recovery power, while maintaining or improving other properties such as percent set and hysteresis. The dramatic increase in physical properties through use of ultra-low unsaturation polyoxypropylene glycols is particularly surprising in view of the fact that aminecured elastomers based on low unsaturation polyols disclosed in the prior art show virtually no improvement in physical properties as compared to elastomers prepared from conventional, "high" unsaturation polyols.

DESCRIPTION OF THE PREFERRED EMBODIMENTS

Figure 1:
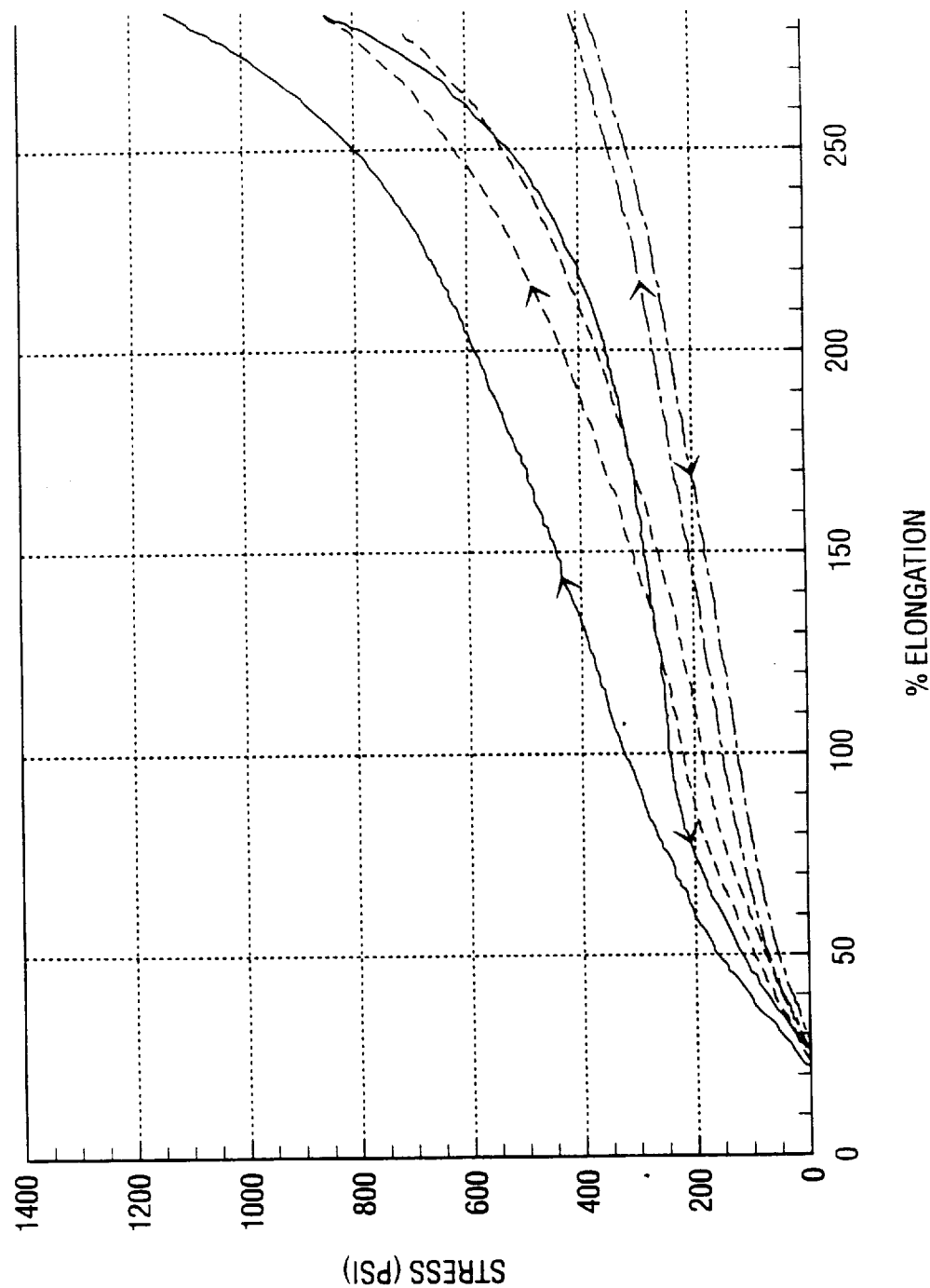
FIG. 1 illustrates hysteresis curves for several spandex-type elastomers.

The spandex-type elastomers of the subject invention must be prepared by a prepolymer process. In such processes, a polyol component, generally composed essentially of diols, is reacted with an excess of diisocyanate, to yield an isocyanate-terminated prepolymer containing a relatively low isocyanate content. Isocyanate contents of from 0.5–8%, preferably from 2–4%, are preferred. The prepolymers are then generally chain extended in solution to form the final elastomer, which may then be spun into fiber or extruded or cast into sheets, etc.

Spandex elastomers prepared by the chain extension of an isocyanate-terminated prepolymer in aprotic solvent cannot be compared with elastomers prepared by one-shot or quasi-prepolymer processes, as both of the latter introduce a significant amount of randomness in the polymer structure. The unusual strength and elongation properties of spandex-type elastomers are believed due to the uniform distribution of hard segments within the polymer matrix. Isocyanate-terminated prepolymers cannot be chain extended with aliphatic diamines neat due to the high reactivity of the diamines utilized.

The reaction spinning process accounts for a minor amount of spandex production, however, the prepolymers of the subject invention are well suited for use therein also. In reaction spinning, the isocyanate terminated prepolymer itself is spun into strands, which are then passed into a bath containing diamine chain extender. While water solutions of aliphatic diamines have been used, it is generally more expedient to dissolve the diamine chain extender in a more volatile solvent such as toluene. Since the prepolymer itself is being spun in the reaction spinning process, prepolymer viscosity must be kept high to prevent dissipation of prepolymer into the solvent and to prevent strand breakage. To achieve the necessary high viscosity, up to about 10 weight percent of the entire polyol component of the prepolymer, preferably about 2–7 weight percent of the polyol component, may be replaced with a low molecular weight triol such as glycerine or tri-methylolpropane or their lower oxyalkylated oligomers. The addition of these amounts causes a large increase in prepolymer viscosity, rendering the prepolymer spinnable.

Those skilled in the art of spandex polymers are aware of the processes used to prepare such. Reference may be made, for example, to U.S. Pat. Nos. 3,384,623; 3,483,167; and 5,340,902, which are herein incorporated by reference.

Both aliphatic and aromatic di- and polyisocyanates may be used to prepare the spandex prepolymers. In general, diisocyanates are preferred, however it is within the scope of the invention to include a minor amount, i.e., not more than approximately 20 mol percent, of a tri- or higher-functionality isocyanate. Preferred isocyanates are identified in the references previously cited, and by way of example, but not by way of limitation, include linear aliphatic isocyanates such as 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, and the like; cycloaliphatic diisocyanates such as isophorone diisocyanate, the cyclohexane diisocyanates, preferably 1,4-cyclohexane diisocyanate, fully hydrogenated aromatic diisocyanates such as hydrogenated tetramethylxylylene diisocyanate, hydrogenated toluene diisocyanates, and hydrogenated methylene diphenylene diisocyanates; and aromatic diisocyanates such as the toluene diisocyanates, particularly the 2,4-isomer, the methylene diphenylene diisocyanates, particularly 2,4' and 4,4'-methylene diphenylene diisocyanate (2,4'- and 4,4'-MDI, respectively), tetramethylxylylene diisocyanate, and the like. Less preferred aromatic diisocyanates include the polymethylene polyphenylene polyisocyanates having functionalities greater than two. Also preferred are modified diisocyanates prepared by reacting one or more diisocyanates with themselves, or with a low molecular weight isocyanate reactive compound to form urea-modified, urethane-modified, carbodiimide-modified, allophanate-modified, uretonimine-modified, biuret-modified, and other modified isocyanates, many of which are commercially available. More than one isocyanate may be used. Particularly preferred is 4,4'-MDI.

A critical component of the spandex elastomer of the subject invention is the polyol component used to prepare the isocyanate-terminated prepolymer. This polyol component must comprise one or more high molecular weight, ultra-low unsaturation polyoxypropylene polyols, in conjunction with one or more low molecular weight diols, the blend of high molecular weight and low molecular weight components such that the average molecular weight of the polyol component is from about 1000 Da to about 10,000 Da, preferably 1250 Da to 5,000 Da, and most preferably about 1500 Da to 2500 Da. The unsaturation of the high molecular weight polyol component is also critical. This polyol component must comprise, in major part, i.e., at least 70 weight percent based on the weight of the high molecular weight polyol component, of an ultra-low unsaturation polyoxypropylene polyol. Most preferably, the entire high molecular weight polyol component has an unsaturation of less than 0.010 meq/g, more preferably less than 0.007 meq/g, and most preferably about 0.005 meq/g or lower. However, it would not depart from the spirit of the invention to include a minor portion of high molecular weight polyoxypropylene polyol which as a somewhat higher unsaturation, for example, but not by way of limitation, up to about 30 weight percent of a polyoxypropylene polyol having an unsaturation of about 0.015 to 0.020 meq/g. In such cases, the actual unsaturation of the high molecular weight polyol component may be slightly higher than 0.010 meq/g. However, as long as the most substantial part, i.e., 70 weight percent or more, of the high molecular weight polyol component comprises an ultra-low unsaturation polyoxypropylene diol, the beneficial results of the invention may be obtained.

Thus, by the term "ultra-low unsaturation polyoxypropylene glycol," is meant a polymer glycol prepared by oxypropylating a dihydric initiator with propylene oxide in the presence of a catalyst such that the total unsaturation of the polyol product is less than 0.010 meq/g. Preferably, the catalyst is a double metal cyanide catalyst such as those disclosed in U.S. Pat. Nos. 5,470,813 and 5,482,908. Through the use of the catalyst disclosed in these references, unsaturations in the range of 0.004 to 0.008 are routinely achieved. The polyoxypropylene glycol may contain oxyethylene moieties distributed randomly or in block fashion. If the oxyethylene moieties are contained in a block, the block is preferably a terminal block. However, randomly distributed oxyethylene moieties are preferred when such moieties are present, as these can be made easily with a double metal cyanide catalyst without the necessity for denaturing the catalyst and conducting additional polyoxyethylation utilizing a conventional catalyst. In general, the polyoxypropylene glycol should contain about 30 weight percent or less of oxyethylene moieties, preferably 20 percent or less, and more preferably about 10 percent or less. The polyoxypropylene glycol may also contain higher alkylene oxide moieties such as those derived from 1,2- and 2,3-butylene oxide and other higher alkylene oxides, or oxetane. The amount of such higher alkylene oxides may be as much as 10–30% by weight of the polyoxypropylene polyol. However, preferably, the polyoxypropylene polyol is substantially derived from propylene oxide or propylene oxide in admixture with minor amounts of ethylene oxide. All such polyols, provided they comprise oxypropylene moieties in major part, are polyoxypropylene polyols as that term is employed herein.

The high molecular weight, ultra-low unsaturation polyoxypropylene glycol has a molecular weight of at least about 1500 Da and may range up to 20,000 Da or higher. Preferably, the molecular weight is in the range of 2000 Da to 10,000 Da, and more preferably in the range of 3000 Da to 8000 Da. It is possible to use a blend of more than one high molecular weight polyoxypropylene polyol. However, when such blends are used, the average molecular weight of the blend of high molecular weight components should be within the ranges previously stated. The polyoxypropylene glycol component further may include minor amounts of higher functionality polyols, particularly polyoxypropylene triols and polyoxypropylene tetrols which may be advantageously added to adjust the viscosity or the spinnability of the prepolymer or prepolymer solution. Preferably, the fibers are prepared from substantially all difunctional polyols, i.e., polyoxypropylene glycol-derived. The polyol component may also contain a minor amount of higher functional polyols such as, but not limited to, ultra-low unsaturation triols and tetrols.

The low molecular weight diol component must have a molecular weight less than 750 Da. Preferably, the molecular weight is less than 500 Da, and more preferably, less than 200 Da. The low molecular weight component may be monomeric, i.e., an alkylene glycol, or may be oligomeric, i.e., a polyoxyethylene glycol or polyoxypropylene glycol. Preferably, low molecular weight glycol ethers such as diethylene glycol or tripropylene glycol are utilized. Non-limiting examples of suitable low molecular weight components include aliphatic glycols such as ethylene glycol, 1,2- and 1,3-propanediol, 1,4-butanediol, 2,2,4-trimethylpentane-1,5-diol, 1,6-hexanediol, 1,8-octanediol, and the like;

aliphatic ethers such as diethylene glycol, triethylene glycol, dipropylene glycol, tripropylene glycol, and the like; and oligomeric polyoxyalkylene diols such as polyoxyethylene diols, polyoxypropylene diols, and block and random polyoxyethylene/polyoxypropylene diols having molecular weights less than 750 Da, preferably less than or equal to 500 Da, and more preferably about 200 Da or lower. More than one low molecular weight diol may be used. Up to about 20 weight percent of a tri- or higher functionality species such as trimethylolpropane, glycerine, or low molecular weight polyoxypropylene triols may also be included.

The high molecular weight, ultra-low unsaturation polyoxypropylene glycol and the low molecular weight diol are blended in proportion such that the number average molecular weight of the blend is between 1000 Da and 10,000 Da, preferably between 1250 Da and 5000 Da and more preferably between 1500 Da and 2500 Da. Following preparation of the polyol blend, the blend is reacted with an excess of the desired diisocyanate, preferably under a nitrogen atmosphere at slightly elevated temperature, i.e., between 50° C. and 100° C., more preferably between 60° C. and 90° C. The reaction of the isocyanate with the polyol may be catalyzed, but is generally preferred that the reaction take place without catalysis. In general, the reaction proceeds until the point where the isocyanate content becomes constant. The isocyanate-terminated prepolymer is then generally extruded into a bath containing diamine extender, or dissolved in a polar aprotic solvent such as dimethyl acetamide, dimethyl formamide, dimethyl sulfoxide, N-methyl pyrrolidone, or the like, and then chain-extended with a diamine as discussed in the references cited previously.

The polymer thus obtained has both hard and soft segments. The terms "soft segment" and "hard segment" refer to specific portions of the spandex polymer chains. The soft segments are the polyether-based portions of the segmented polyurethane/urea polymer, derived from the polyoxypropylene glycol. The hard segments refer to the portions of the polymer chains that are derived from the diisocyanate and chain extender. The term "NCO content" refers to the isocyanate group content of the prepolymer, before chain extension. The term "molecular weight" means number average molecular weight unless indicated otherwise. The number average molecular weights for the polyether glycols are each determined from the hydroxyl number of the polyether glycol as measured by the imidazole-pyridine catalyst method described by S. L. Wellon et al., "Determination of Hydroxyl Content of Polyurethane Polyols and Other Alcohols", ANALYTICAL CHEMISTRY, Vol. 52, No. 8, pp. 1374–1376 (July 1980).

Suitable chain extenders include ethylene diamine, 1,3-propylene diamine, hydrazine, piperazine, tetramethylene diamine, cyclohexylene-1,3-diamine (hydrogenated m-phenylene diamine), isophorone diamine, or mixtures of these diamines. Preferred are mixtures containing ethylene diamine as the major component. Ethylene diamine as the sole chain extender is particularly preferred. Other diamine chain extenders useful in the present invention include diethyltoluene diamine, 4,4'-methylenebis(2-chloroaniline) ("MOCA"), 1,4-diamino-2-methylpiperazine, 1,4-diamino-2,5-dimethylpiperazine, and methyl bispropylamine, substituted aromatic diamines such as the product commercially available as UNI-LINK 4200, a product of UOP, Inc., N,N-bis(2-hydroxypropyl)aniline commercially available as ISONOL 100, a product of Dow Chemical Corporation, and combinations thereof. Aromatic diamines should be used in most minor amounts. Most preferably, the diamine chain extender comprises substantially aliphatic and/or cycloaliphatic diamines. By "substantially" in this respect is meant in excess of 70 weight percent based on total chain extender weight. Minor portions of diol chain extenders such as those traditionally used in other elastomers may be added under appropriate circumstances, however, use of diol chain extenders is not preferred. Such diol chain extenders include ethylene glycol, propylene glycol, 1,4-butanediol, 1,6-hexanediol, diethylene glycol, dipropylene glycol, and the like. It is highly preferred that the greatest part of the chain extender, i.e. greater than 90 weight percent and more preferably greater than 95 weight percent, be aliphatic and/or cycloaliphatic diamine(s).

Chain terminators may be included in the reaction mixture to adjust the final molecular weight, and thus the intrinsic viscosity, of the polyurethane/urea polymer to the desired value. Usually, the chain terminators are monofunctional compounds such as secondary amines, for example diethylamine or dibutylamine, or hydroxyl or thiol functional compounds such as n-butanol or dodecane thiol. The terminator content is adjusted such that the resultant spandex polymer, dissolved in a polar, aprotic solvent, has a viscosity in the range of 100 to 10,000 poise at 25° C., preferably 150 to 5000 poise at 10–50% solids, preferably 25–45% solids. The polymer should have an intrinsic viscosity in the range of 0.75 to 2.5 dL/g, preferably 1.0 to 1.8 dL/g, when measured at 25° C. in N,N-dimethylacetamide at a concentration of 0.5 grams per 100 milliliters of solution.

EXAMPLES

The following procedure was used to prepare the elastic polymer. Polyol was mixed with the appropriate lower molecular weight active hydrogen-containing compound. The resulting blend was mixed with 4,4'-diphenyl methane diisocyanate (4,4-'MDI) and heated for about 8 hours at 80° C. to yield the appropriate isocyanate-terminated polyether prepolymer (i.e., isocyanate capped glycol). The prepolymer was then mixed with dimethylacetamide (DMAc) for about 2 minutes to form a solution containing about 21.3% solids. Then, while the prepolymer solution was still being mixed, a mixture of ethylene diamine (EDA) chain extender and diethylamine (DEA) chain terminator dissolved in additional DMAc was added to the isocyanate-terminated polyether prepolymer solution and the resulting reaction formed the desired segmented polyurethane/urea. The additional amount of DMAc decreased the solids concentration of the resultant solution to 20% by weight of the total solution.

Films were cast onto glass plates from the polymer solution. The films were dried and cut with a die into 0.25" wide strips. Elastic properties of spandex films were measured in general accord with the procedures described in ASTM D 2731-72. This method was designed mainly for the testing of elastic threads and yarns rather than films. However, the parameters tested by this method are those commonly used to evaluate the elastic properties of spandex. Tests were run on a constant-rate-of-extension type tensile testing machine with a load capacity of 50N (11.2 lb). The samples were gripped by pneumatically operated clamps. In order to avoid tearing at the grips, films were sandwiched between two pieces of self-fusing Okonite No. 35 Jacketing Tape.

The hysteresis of the films were also determined. Hysteresis is a measure of the energy loss during stretching and retraction of an elastic material. When a film or fiber is extended on the testing machine and the direction of crosshead travel is reversed to record the retraction, the unload curve falls below the load curve as shown in FIG. 1. The difference in stress-strain properties between the stretching and retraction portions of a given test cycle forms a hysteresis loop. The area bounded by the load and unload curves can be used to quantify the degree of hysteresis in a film, fiber, yarn or fabric. A larger hysteresis loop or energy loss implies heat generation and thus discomfort in wear.

Spandex With Improved Properties Obtained From 4000 Molecular Weight Ultra-Low Unsaturation Polyol/TPG Blends Example 1 and Comparative Examples C1–C3

The table and FIG. 1 compare spandex based on a 2000 Da blend of a 4000 Da molecular weight, ultra-low unsaturation polyoxypropylene polyol blended with tripropylene glycol (TPG), prepared according to the invention (Example 1), to a spandex based on a 2000 molecular weight polytetramethylene ether glycol (PTMEG-2000) which is considered the "standard of the industry" (Comparative Example C1) and spandex based on ultra-low unsaturation polyoxypropylene glycols without TPG (Comparative Examples C2 and C3).

TABLE 1

| Example | Polyol(s) | Low MW Species | Effective Polyol MW | Unsaturation Content of Polyol Blend (meq/gm) | NCO/OH | % NCO | UP @ 100% (psi) | UP @ 200% (psi) | % Set | Area |
|---|---|---|---|---|---|---|---|---|---|---|
| C1 | PTMEG-2000 | — | 2000 | 0 | 1.7 | 2.30 | 235 | 336 | 20 | 47100 |
| 1 | 4000 | TPG | 2000 | 0.005 | 1.7 | 2.29 | 174 | 356 | 18 | 15220 |
| C2 | 2000 | — | 2000 | 0.005 | 1.7 | 2.32 | 124 | 314 | 37 | 17470 |
| C3 | 4000 | — | 4000 | 0.005 | 1.7 | 1.22 | 116 | 226 | 20 | 7730 |

% NCO: NCO content (wt. %) of the prepolymer.
UP @ 100%: 5th cycle unload (retractive) power at 100% elongation.
UP @ 200%: 5th cycle unload (retractive) power at 200% elongation.
Area = Area between the load and unload curves (psi*%) - Indicates amount of hysteresis.
TPG - Tripropylene Glycol.

For the examples, sample strips of 0.25 inch width and 2.5 inch gauge length were cycled five times between the limits of 0 to 300% elongation. On the fifth cycle, the specimen was held in the extended state for 30 seconds before returning the crosshead. On the return cycle after holding at 300% elongation for 30 seconds, the crosshead was returned and the forces at 300, 200 and 100% elongation were recorded. By dividing the force at each of these points by the initial film cross-sectional area, the unload power or retractive power was calculated for each of these points. In order to calculate % set, 30 seconds after completion of the fifth cycle, the crosshead was slowly lowered until visible slack was just removed from the film. The extension was recorded to the nearest 0.01". Set, as calculated from the following formula, is defined as the difference between the original and final length, expressed as a percentage of the original length.

Set, in percent=[(Final Length−Initial Length)/Initial Length]*100

Fiber or film made from spandex polymer according to the invention generally has a set of no greater than 30%, preferably, no greater than 25%, and most preferably about 20% or less.

Table 1 shows that Comparative Example C3 spandex based on ultra-low unsaturation polyoxypropylene glycol having a molecular weight of 4000 Da without addition of low molecular weight TPG, gave dramatically improved hysteresis and similar percent set values to those of spandex prepared using PTMEG-2000 (Comparative Example C1). In addition, C3 exhibited elongations at break of greater than 1300%. Thus, in spandex-type elastomers, the behavior of ultra-low unsaturation polyoxypropylene glycols is dramatically different from the behavior of low unsaturation polyoxypropylene glycols as disclosed by Smith and Chen, who disclosed virtually no difference between spandex prepared from PTMEG and spandex prepared from low unsaturation polyoxypropylene glycols (unsaturation≈0.015 meq/g). However, the retractive properties of C3 are inferior. Switching to a 2000 Da molecular weight ultra-low unsaturation polyoxypropylene glycol without TPG at the same NCO/OH ratio (Comparative Example C2) resulted in slightly improved retractive properties, however, the elastomer has an unacceptably high percent set value.

Spandex of Example 1, made according to the invention using a 4000 Da molecular weight ultra-low unsaturation polyoxypropylene glycol blended with TPG to obtain a polyol number average weight of 2000 Da, gave dramatically improved retractive properties over Comparative Examples C2 and C3 and yielded percent set values comparable to Comparative Example C1 which was based on PTMEG, the industry standard. In addition, the spandex of Example 1 also exhibits approximately three times less hysteresis than Comparative Example C1, based on PTMEG. A higher hysteresis or energy loss value implies heat generation and thus discomfort in wear. Example 1 spandex also exhibited an elongation at break of 1040%, while values of 450–600% are usually reported for PTMEG-based spandex.

The hysteresis may be visualized with reference to FIG. 1, which illustrates the stress-strain curves after the fifth stretching cycle of the elastomers of Example 1 and Comparative Examples C1 and C3. the solid line represents a portion of the hysteresis loop of the spandex elastomer of Comparative Example C1, the industry standard PTMEG-derived spandex. The dashed curve illustrates the hysteresis of Example 1, while the dashed and dotted curve (lowest of the curves) represents the hysteresis of Comparative Example C3, containing no low molecular weight diol. Although the hysteresis of Comparative Example C3 is low, the elastomer has low retractive power.

Spandex With Improved Properties: Effect of Unsaturation Content

Example 1 and Comparative Example C4

A spandex film was prepared and tested as previously disclosed from a conventional polyoxypropylene glycol of 4000 Da molecular weight, having a typical (high) unsaturation of 0.062 meq/g (Comparative Example C4) blended with TPG to obtain a polyol number average molecular weight of 2000 Da. The ultra-low unsaturation of the spandex of Example 1 is low enough that the resulting spandex has excellent properties, whereas, the high level of unsaturation in Comparative Example C4 resulted in spandex with inferior properties, in particular, an unacceptably low unload power, as well as a higher than desired percent set.

TABLE 2

| Example | Polyol(s) | Low MW Species | Effective Polyol MW | Unsaturation Content of Polyol Blend (meq/gm) | NCO/OH | % NCO | UP @ 100% (psi) | UP @ 200% (psi) | % Set |
|---|---|---|---|---|---|---|---|---|---|
| 1 | 4000 | TPG | 2000 | 0.005 | 1.7 | 2.29 | 174 | 356 | 18 |
| C4 | 4000 | TPG | 2000 | 0.062 | 1.7 | 2.20 | 102 | 243 | 29 |

Comparison at Equal NCO/OH Ratios: Spandex With Improved Properties Obtained From 4000 MW Ultra-Low Unsaturation Polyoxypropylene Glycol/TPG Blends Examples 1–3 and Comparative Example C3

Examples 1, 2 and 3 prepared according to the invention are based on a 4000 Da molecular weight ultra-low unsaturation polyoxypropylene glycol to which enough TPG has been added to lower the polyol molecular weight to 2000 Da, 1750 Da and 1500 Da, respectively. These samples show increasingly improved retractive properties over those of a spandex based solely on 4000 Da molecular weight ultra-low unsaturation polyol, such as Comparative Example 3, while also possessing a low percent set.

TABLE 3

| Example | Polyol(s) | Low MW Species | Effective Polyol MW | Unsaturation Content of Polyol Blend (meq/gm) | NCO/OH | % NCO | UP @ 100% (psi) | UP @ 200% (psi) | % Set |
|---|---|---|---|---|---|---|---|---|---|
| C-3 | 4000 | — | 4000 | 0.005 | 1.7 | 1.22 | 116 | 226 | 20 |
| 1 | 4000 | TPG | 2000 | 0.005 | 1.7 | 2.29 | 174 | 356 | 18 |
| 2 | 4000 | TPG | 1750 | 0.005 | 1.75 | 2.71 | 183 | 390 | 22 |
| 3 | 4000 | TPG | 1500 | 0.005 | 1.7 | 2.96 | 201 | 429 | 20 |

Comparison at Equal % NCO: Spandex With Improved Properties Obtained From Polyol/TPG Blends Examples 2 and 4

Spandex Example 2, based on a 4000 Da molecular weight ultra-low unsaturation polyoxypropylene glycol to which enough TPG has been added to lower the molecular weight to 1750 Da, and Spandex Example 4, based on a 80/20 wt% blend of 4000 Da and 8000 Da molecular weight ultra-low unsaturation polyoxypropylene glycols to which enough TPG has been added to lower the molecular weight to 1800, both exhibit excellent unload, or retractive power, and low percent set.

TABLE 4

| Example | Polyol(s) | Low MW Species | Effective Polyol MW | Unsaturation Content of Polyol Blend (meq/gm) | NCO/OH | % NCO | UP @ 100% (psi) | UP @ 200% (psi) | % Set |
|---|---|---|---|---|---|---|---|---|---|
| 4 | 8000/4000 | TPG | 1800 | 0.005 | 1.75 | 2.72 | 190 | 385 | .18 |
| 2 | 4000 | TPG | 1750 | 0.005 | 1.75 | 2.71 | 183 | 390 | 22 |

Spandex With Improved Properties Obtained From Polyol/1,4-Butanediol Blends

Example 5, Comparative Example C5

Spandex of Example 5, based on a 4000 Da molecular weight ultra-low unsaturation polyoxypropylene glycol to which enough BDO has been added to lower the molecular weight to 3000, shows improved elastic properties (retractive power and set) over spandex from Comparative Example C5, which is based solely on a 3000 Da molecular weight ultra-low unsaturation polyoxypropylene glycol containing 10% random internal oxyethylene.

Lower Prepolymer and Polymer Solution Viscosities Using Ultra-Low Unsaturation Polyol/ Low Molecular Weight Diol Blends In addition to advantages in the polymer properties highlighted above, there are also surprising processing advantages with both the isocyanate prepolymer and the polymer solutions of the subject invention. Table 7 highlights the advantage in prepolymer viscosities of two examples prepared according to the invention versus a comparative prepared with PTMEG at equivalent NCO/OH ratio. Surprisingly, the prepolymers prepared according to the invention are about eight times lower in viscosity than those

TABLE 5

| Example | Polyol(s) | Low MW Species | Effective Polyol MW | Unsaturation Content of Polyol Blend (meq/gm) | NCO/OH | % NCO | UP @ 100% (psi) | UP @ 200% (psi) | % Set |
|---|---|---|---|---|---|---|---|---|---|
| 5 | 4000 | BDO[1] | 3000 | 0.005 | 1.95 | 2.17 | 153 | 332 | 22 |
| C5 | 3000[2] | — | 3000 | 0.005 | 2.01 | 2.19 | 140 | 300 | 26 |

[1] 1,4-Butanediol
[2] 3000 Da molecular weight ultra-low unsaturation diol containing 10% random internal oxyethylene moieties Spandex With Improved Properties Obtained From Polyol/Polyoxypropylene Glycol-425 Blends Example 6 and Comparative Example C2

Spandex of Comparative Example C2, which is based solely on a 2000 Da molecular weight ultra-low unsaturation polyoxypropylene glycol, shows a percent set which is unacceptable. By contrast, spandex of Example 6, based on a 4000 Da molecular weight ultra-low unsaturation polyoxypropylene glycol containing 10% random internal oxyethylene to which enough polyoxypropylene glycol-425 has been added to lower the molecular weight to 2000 Da, shows a set of only 20%. In addition, the spandex of Example 6 also shows improved retractive power at 100% elongation.

based on PTMEG-2000. Lower viscosity greatly enhances the ease of prepolymer production and in processing the prepolymer into the polymer solution prior to fiber manufacture.

TABLE 6

| Example | Polyol(s) | Low MW Species | Effective Polyol MW | Unsaturation Content of Polyol Blend (meq/gm) | NCO/OH | % NCO | UP @ 100% (psi) | UP @ 200% (psi) | % Set |
|---|---|---|---|---|---|---|---|---|---|
| 6 | 4000[1] | PPG-425[2] | 2000 | 0.005 | 1.69 | 2.14 | 153 | 312 | 20 |
| C2 | 2000 | — | 2000 | 0.005 | 1.7 | 2.32 | 124 | 314 | 37 |

[1] Polyol contains 10% random internal oxyethylene moieties
[2] ARCOL ® PPG-425, a 425 molecular weight polyoxypropylene glycol

TABLE 7

| Example | Polyol(s) | Low MW Species | Effective Polyol MW | Unsaturation Content of Polyol Blend (meq/gm) | NCO/OH | % NCO | Prepolymer Viscosity (cps @ 60° C.) | Prepolymer Viscosity (cps @ 80° C.) |
|---|---|---|---|---|---|---|---|---|
| C1 | PTMEG-2000 | — | 2000 | 0 | 1.7 | 2.30 | 54,300 | 21,400 |
| 3 | 4000 | TPG | 1500 | 0.005 | 1.7 | 2.96 | 8,000 | 2,700 |
| 4 | 8000/4000 | TPG | 1800 | 0.005 | 1.75 | 2.72 | 6,700 | 2,600 |

Another advantage is the viscosity of the polymer solutions. Table 8 compares the viscosity of polymer solutions (20% solids in DMAC) prepared according to the invention versus a comparative example based on PTMEG. The polymer solutions prepared according to the invention have dramatically lower viscosities than those based on PTMEG-2000. Polymer solution viscosity is normally a direct function of the weight average molecular weight, however, the weight average molecular weights of polymer solution Examples 3 and 4 are even higher than Comparative C-1 based on PTMEG-2000. This unexpected development will allow one to produce polymer solutions at a higher solids content which translates to higher throughput during the fiber spinning step. The removal of solvent (DMAC) is the rate limiting step in terms of the speed of fiber production. Higher polymer solids content means a lower solvent content which in turn means less solvent to remove during fiber spinning and a faster rate of production. Polymer solution viscosity, as measured at 20 weight percent solids in DMAC at 25° C., is preferably less than about 20,000 cps, more preferably less than about 15,000 cps.

An unexpected benefit provided by the spandex polymers of the subject invention is their very low solution viscosities as compared to otherwise similar polymers prepared from 2000 Da PTMEG alone or 2000 Da PTMEG mixed with a low molecular weight diol substituted for the ultra-low unsaturation high molecular weight polyoxypropylene glycol/low molecular weight diol blend of the subject invention. The subject invention polymer solution viscosities, as measured at 20% solids in DMAC at 25° C., should be less than that of the PTMEG-derived elastomer by a factor of at least 2, preferably a factor of 3, and more preferably a factor of 4 or more.

As a result of the lower solution viscosity at given solids concentration, the solids content of the subject invention spandex polymer solutions can be increased substantially, raising the throughput of the film or fiber (inclusive of other forms as well) extrusion process. At the same time, the polymer molecular weights may be maintained at a high value, higher than those of otherwise similar polymers derived from 2000 Da molecular weight PTMEG at the same isocyanate to hydroxyl group ratio. The molecular weights may be as high as 400,000 Da, and can easily reach 300,000 Da.

Having now fully described the invention, it will be apparent to one of ordinary skill in the art that many changes

TABLE 8

| Example | Polyol(s) | Low MW Species | Effective Polyol MW | Unsaturation Content of Polyol Blend (meq/gm) | NCO/OH | % NCO | Polymer Solution Viscosity (cps @ 25° C.) | Polymer Weight Average MW* |
|---|---|---|---|---|---|---|---|---|
| C1 | PTMEG-2000 | — | 2000 | 0 | 1.7 | 2.30 | 30,000 | 362,000 |
| 3 | 4000 | TPG | 1500 | 0.005 | 1.7 | 2.96 | 5,700 | 409,000 |
| 4 | 8000/4000 | TPG | 1800 | 0.005 | 1.75 | 2.72 | 8,800 | 418,000 |

*The polymer weight average molecular weights were determined by gel permeation chromatography (GPC) using a Waters GPC equipped with a Waters Model 510 HPLC Pump and a Waters 410 Differential Refractomer. The samples were analyzed versus polymethylmethacrylate (PMMA) standards on a Styrogel ® column using N,N-dimethylformamide at 50° C.

The spandex polymer solutions useful for extruding as a sheet into a film or as a fiber from a spinerette or other equivalent forms (i.e. hollow fibers, tubes, strips, etc.) generally have a limiting maximum viscosity beyond which the extrusion or spinning process is ineffective. This maximum effective processing viscosity may vary somewhat with the particular equipment utilized, however, its value is readily determined by one skilled in the art by the simple expedient of increasing spandex polymer solution solids content, and hence solution viscosity, to the point where the extrusion or spinning operation cannot be performed or maintained. Such tests are routinely done by those skilled in the art of wet solution spinning and dry solution spinning, for example.

and modifications can be made thereto without departing from the spirit or scope of the invention as set forth herein.

What is claimed is:

1. A process for increasing throughput in the preparation of films or fibers of segmented polyurethane/urea spandex elastomers by extrusion of a segmented polyurethane/urea spandex polymer dissolved in a polar aprotic solvent, said solution having a maximum effective processing viscosity, said process comprising selecting as said segmented polyurethane/urea spandex polymer a diamine chain-extended isocyanate-terminated prepolymer prepared by reacting an excess of one or more di- or polyisocyanates with a polyol component comprising a high molecular weight polyol portion comprising one or more ultra-low unsaturation polyoxypropylene glycols, said high molecular weight polyol portion having a number average molecular weight of about 1500 Da or more, and a low molecular weight diol portion, said low molecular weight diol portion having a number average molecular weight of about 750 Da or less, wherein said spandex polymer solution has a solution viscosity which is at least 50% lower than a PTMEG-derived segmented polyurethane/urea polymer solution containing a PTMEG-derived segmented polyurethane/urea polymer prepared from the same components as said segmented polyurethane/urea spandex polymer except that said polyol component is replaced by a 2000 Da molecular weight PTMEG, both viscosities measured at 20 weight percent solids at 25° C., and increasing said solids content of said polyurethane/urea spandex polymer in said solution to a solids content higher than the solids content of said PTMEG-derived segmented polyurethane/urea contained in said solution having a maximum effective processing viscosity to provide a solution viscosity less than or equal to said maximum effective processing viscosity.

2. The process of claim 1 wherein said spandex polymer solution viscosity determined at 20 weight percent polymer solids in dimethylacetamide at 25° C. is less than about 20,000 cps.

3. The process of claim 1 wherein said spandex polymer solution viscosity determined at 20 weight percent polymer solids in dimethylacetamide at 25° C. is less than about 15,000 cps.

4. The process of claim 1 wherein said polymer has a weight average molecular weight of about 300,000 Da or more.

5. The process of claim 1 wherein the segmented polyurethane/urea spandex polymer comprises the reaction product of:

an isocyanate-terminated prepolymer having a free NCO group content of from about 0.5 percent to about 8 percent by weight, said prepolymer comprising the reaction product of:
  (a) a stoichiometric excess of an isocyanate component comprising one or more diisocyanates;
  (b) a glycol component comprising
    (i) a high molecular weight glycol component comprising in major part, one or more ultra-low unsaturation polyoxypropylene glycols individually having a molecular weight of between about 1500 Da and 20,000 Da and an unsaturation less than about 0.010 meq/g, and
    (ii) a low molecular weight diol having a molecular weight less than 750 Da, such that the average molecular weight of said glycol component is from about 1000 Da to 10,000 Da, with a chain extender comprising one or more aliphatic diamine and/or cycloaliphatic diamine chain extender (s), wherein prior to reaction with said diamine chain extender, said isocyanate-terminated prepolymer is dissolved in a polar aprotic solvent.

* * * * *